(12) United States Patent
Kirk et al.

(10) Patent No.: US 9,470,047 B2
(45) Date of Patent: Oct. 18, 2016

(54) CENTRALISER

(75) Inventors: Andrew Kirk, Methlick (GB); Ian Kirk, Aberdeen (GB)

(73) Assignee: Downhole Products Limited, Aberdeen (GB)

( * ) Notice: Subject to any disclaimer, the term of this patent is extended or adjusted under 35 U.S.C. 154(b) by 531 days.

(21) Appl. No.: 13/989,684

(22) PCT Filed: Jan. 13, 2012

(86) PCT No.: PCT/GB2012/050066
§ 371 (c)(1),
(2), (4) Date: May 24, 2013

(87) PCT Pub. No.: WO2012/095671
PCT Pub. Date: Jul. 19, 2012

(65) Prior Publication Data
US 2013/0248207 A1    Sep. 26, 2013

(30) Foreign Application Priority Data
Jan. 13, 2011 (GB) .................................. 1100543.6

(51) Int. Cl.
*E21B 17/10* (2006.01)
*B23P 17/00* (2006.01)

(52) U.S. Cl.
CPC ............ *E21B 17/1078* (2013.01); *B23P 17/00* (2013.01); *E21B 17/1014* (2013.01); *E21B 17/1028* (2013.01); *Y10T 29/49* (2015.01)

(58) Field of Classification Search
CPC ............ E21B 17/1028; E21B 17/1078; E21B 17/1014
USPC ............................................ 166/241.6, 241.7
See application file for complete search history.

(56) References Cited

U.S. PATENT DOCUMENTS

| | | | | |
|---|---|---|---|---|
| 2,828,824 A | * | 4/1958 | Comstock | E21B 17/1028 166/241.7 |
| 4,520,869 A | * | 6/1985 | Svenson | E21B 17/1028 166/172 |
| 4,651,823 A | * | 3/1987 | Spikes | E21B 17/1028 166/241.7 |
| 4,688,636 A | * | 8/1987 | Hennessey | E21B 17/1028 166/241.7 |
| 5,238,062 A | * | 8/1993 | Reinholdt | E21B 17/1028 166/241.7 |
| 2003/0000607 A1 | | 1/2003 | Jenner | |

FOREIGN PATENT DOCUMENTS

GB    2249333 A    5/1992

OTHER PUBLICATIONS

Maukonen, Kalle, "International Search Report" For PCT/GB2012/050066 as mailed Oct. 30, 2012, 3 pages.

* cited by examiner

*Primary Examiner* — Jennifer H Gay
*Assistant Examiner* — George Gray
(74) *Attorney, Agent, or Firm* — Winstead PC

(57) ABSTRACT

A centralizer includes a body having a bore with an axis, the bore being configured to receive a tubular to be centralized, the body having at least one resilient device configured to extend radially from the axis of the bore, wherein the body has at least one collar member extending radially inwards from the centralizer body adjacent to an end of the body. The collars are fixed co-axially in the bore to be resistant to axial movement of the collar member, and can be retained in the body by radially extending a lip formed by forcing material radially inwards into the bore to retain the collar. The body is adapted to receive within the bore an anchoring device for connection to the tubular. The anchoring device is configured to engage the collar member within the bore so that relative movement of the centralizer and the tubular is restricted.

30 Claims, 1 Drawing Sheet

Detail B

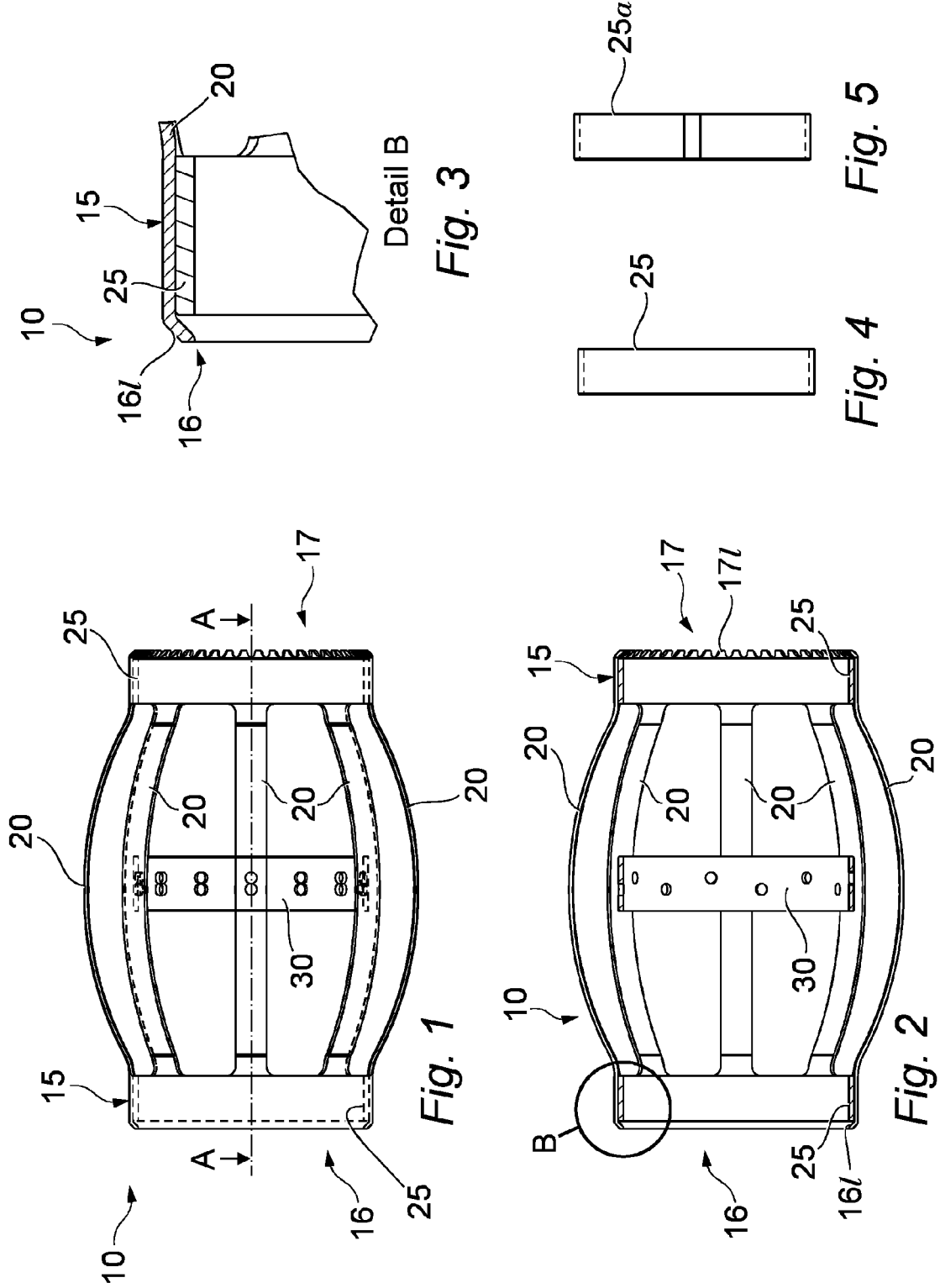

CENTRALISER

The present invention relates to a centraliser, particularly but not exclusively to a spring type centraliser for use in oil, gas or water wells, to centralise a length of tubing within a wellbore.

Typically centralisers have a body that fits around the tubular, and the body typically extends radially away from the tubular so that the tubular is spaced from the wall of the wellbore. Centralisers are installed onto the tubular that they are intended to centralise, and then the whole assembly of the tubular and centraliser (or many centralisers on one tubular) is run into the hole. Spring type centralisers typically have resilient parts such as bow springs which expand radially against the inner wall of the wellbore to maintain the spacing between the tubular string and the wellbore.

According to the present invention there is provided a centraliser for an oil, gas or water well, the centraliser having a body, and the body having a bore with an axis, the bore being configured to receive a tubular to be centraliser, the body having at least one resilient device configured to extend radially from the axis of the bore, wherein the body has at least one collar member extending radially inwards from the centraliser body adjacent to an end of the body.

Typically the resilient device is configured to move between a first (e.g. compressed) configuration in which the resilient device is disposed at a first radial distance from the axis of the body, and a second (e.g. expanded) configuration in which the resilient device is disposed at a second radial distance from the axis of the body, and wherein the first radial distance is less than the second radial distance, so that the resilient device is spaced radially further away from the body when in the second configuration than in the first configuration. Typically the resilient device moves resiliently between the two configurations.

Typically the resilient device is integral with the body and the body optionally comprises a resilient sheet material such as a sheet of resilient metal. The material can be inherently resilient or can be treated to make it resilient or to enhance its resilient properties. The resilient device typically extends radially from the resilient sheet material. The resilient device is typically held in a radially extended configuration while the body is treated to retain the radially extended configuration of the resilient device after the treatment. For example, in one embodiment, the body can be heat treated to retain the radially extended configuration. This allows the body and the resilient device to be formed from a single sheet of e.g. sprung steel, in a single cutting or stamping operation.

The resilient device is typically formed as a strip of the resilient sheet material by removing material from areas beside the strip to allow the resilient device to move relative to the rest of the sheet, e.g. to spring radially outwards from the sheet. Typically material is removed from sections that are parallel to the axis of the bore of the body, and the resilient device typically extends parallel to the axis. The material can be cut or stamped to form the resilient device from the sheet material.

The body can be formed as a rolled sheet that is rolled into a tubular configuration and held by welding, soldering or by fixings, for example, using fixings such as bolts, screws, pins or the like.

The collar member can optionally be formed as a separate member from the body and can be secured to the (or each) end of the body by any suitable means, for example by welding, soldering or by fixings, for example, using fixings such as bolts, screws, pins or the like, typically after or during assembly of the body, e.g. after the body has been pressed, but optionally before the body has been rolled into a tubular configuration for mounting on the tubular.

In certain embodiments the collar member can optionally be formed as an integral part of the body rather than being formed separately and secured during assembly. For example, in one optional embodiment, the centraliser body can be formed from a single piece of material with differing thickness at different points on the body. For example the material could be thicker near the top and bottom of the body where the collars are to be formed. In certain embodiments, it is possible to roll or press internal collars on the inner surface of the centralizer body. This can be achieved by forming the body as a flat piece of metal or other material with thickened end portions which are adapted to form the collars later in the assembly procedure, and then rolling the flat sheet into a tubular body, fixing it in its tubular configuration by welding or other methods. The thickened ends of the flat sheet can be pressed or stamped or the sheet can be rolled through a die adapted to form the flat sheet with thickened ends before cutting or stamping the slots between the bow springs and rolling the sheet into a tubular configuration. The thickened ends can optionally have flat faces, which can optionally extend perpendicular to the body, so that they extend radially inwards at 90 degrees to the inner surface of the body when it is rolled into a tubular form. The precise angle and shape of the collar face can be varied without departing from the scope of the invention. It is sufficient that the collar engages the anchoring device and restricts relative movement of the body and the anchoring device.

In certain embodiments of the invention, the collar can take the form of at least one formation extending radially inwards from the inner surface of the centraliser body. The formation can optionally be formed as a tab or portion of the sheet material being bent radially inwards of the body. In some embodiments the tab can be secured to one (or each) end of the body by welding, soldering or by fixings as described above. In some circumstances the collar can be annular. In some cases the collar member can be discontinuous and can extend only partly around the inner circumference of the body of the centraliser. In discontinuous arrangements the collar members can be disposed at regular intervals around the inner circumference of the body of the centraliser, but could also be spaced at irregular intervals. A single collar member extending partly around the inner circumference of the body could suffice in some embodiments.

The bore typically passes radially inwardly of the collar member, typically aligned with the axis of the collar member. The inner bore of the collar member typically has an inner diameter that is a sliding fit over the tubular, allowing the tubular to slide within the bore of the collar member.

The collar member typically comprises an annular ring, extending at least part of the way around the inner surface of the body, and typically adapted to fit over a cylindrical tubular, but the bore of the collar member (or the whole of the collar member) can be of other shapes adapted to receive the tubular in a sliding fit.

The body typically has at least two collar members, typically a collar member is provided at or near each end of the body.

The or each collar member is typically provided close to or at an end of the body of the centraliser, but can acceptably be located between a midway point in the axis of the body and an end of the centraliser, and it is not necessary for the collar member to be located precisely at an end of the body, and in fact in some embodiments, the collar members are spaced from the ends by a lip for example. Where collar members are provided at or near each end of the body, it is not necessary for each collar member to be provided at the same point on the body, and the two ends of the centraliser body can optionally be different in this respect.

The body is typically anchored to a section of tubular by providing an anchoring device that typically takes the form of an annular anchoring ring extending at least part of the way around the outer surface of the tubular, and is typically fixed to the tubular by means of grub screws, or other locking devices, for example by tongue and groove locking mechanisms or the like, which can optionally be activated to lock the anchoring ring in place after it has been applied to the tubular in the correct position, and typically allows adjustment of the position of the anchoring ring on the tubular before locking the anchoring ring in position.

Typically the anchoring device is configured to engage at least one collar member so that relative movement of the centraliser and the tubular is restricted or prevented once the anchoring device engages the collar member. Typically this is achieved by providing the anchoring device with a radial extension (e.g. an inner or outer diameter) configured to at least overlap with a radial extension (e.g. an inner or outer diameter) of the collar member. The anchoring device typically has end faces that extend radially with respect to the axis of the body. Typically the anchoring member is adapted to engage each of the collar members on the body.

Optionally the anchoring device can have a similar inner diameter to the collar member, so that when the anchoring device is fixed to the tubular, the centraliser can move axially relative to the tubular only until e.g. an end face of the collar member abuts an end face of fixed anchoring device, and the two components engage to restrict axial movement of the body relative to the fixed anchoring device within a limited range, which is typically governed by the axial distance between adjacent collar members on the body.

Typically the anchoring device permits rotational movement of the body relative to the tubular even while the axial movement is restricted by engagement of the collar member with the anchoring device. In different embodiments of the invention, the inner diameter of the collar member can overlap with the outer diameter of the anchoring device, or the outer diameter of the collar member can overlap with the inner diameter of the anchoring device. These components can therefore adopt various different arrangements within the scope of the invention provided that they can engage to restrict movement of the body when the anchoring device is fixed in position on the tubular.

The or each end of the body is typically formed to receive the outer diameter of the collar members within a bore, typically a cylindrical bore where the collar member is an annular ring with a circular cross section. The collar member typically fits with a close tolerance into the bore of the end of the body so that it can be held in the bore securely. The collar member can optionally be fixed in the bore typically resistant to axial movement of the collar member within the bore, for example, by welding, soldering or by fixings, typically located at spaced apart locations around the circumference of the collar members, for example welds or solders can be applied at 2 or 3 equidistantly spaced locations around the outer diameter of the collar member.

Optionally the collar member can be a closed annular ring, although in some embodiments, the collar member can be a split ring, capable of adopting different diameters (e.g. inner diameters) as a result of opening or closing forces being applied to the split ends of the ring.

In some embodiments the collar member can be inserted into the ends of the body through the ends thereof, optionally before the sheet material of the body has been fixed by e.g. welding or soldering the sides to form a tubular body. In some other embodiments the body is formed in the tubular configuration before the collar members are connected to the body. In one such embodiment, the collar members can either be passed through the open end bores or can be passed through spaces between the resilient devices, and in such embodiments, the collar members typically have a smaller outer diameter than the axial lengths of slots in the body between the resilient members, so as to allow passage of the collar members through the slots. Typically also the collar member can have an axial depth that is less than the circumferential width of the slot between the resilient members, so that the collar member can pass through the slot.

In some embodiments of the invention, the end of the body has a lip that extends beyond the collar member located in the end bore, and optionally the lip is formed with a smaller diameter than the end bore, and typically with a smaller inner diameter than the outer diameter of the collar member, to thereby retain the collar member within the end bore. The narrowing of the lip can be formed by swaging or bending or folding the material of the body radially inwards and the lip can optionally incorporate cutaways or similar sections from which material has been removed in order to facilitate narrowing of the bore at the lip. The narrowed portion of the lip can typically be formed before or after insertion of the collar member into the bore.

The collar member typically has an end face that engages the anchoring device so that when the anchoring device is fixed in position on the tubular and the assembled centraliser is located over it, the anchoring device allows free rotation of the centraliser around the anchoring device and the tubular, but restricts axial movement of the centraliser along the tubular within a restricted range, by engaging the end faces of the collar members at each end of the centraliser. Therefore, the centraliser can move freely up the string until the lower face of the anchoring member engages the upper end face of the lower collar member, at which point, the body of the centraliser cannot move up any further in the axial direction, although it can still rotate around the tubular and the anchoring member. Likewise, the centraliser can move freely down the string until the upper face of the anchoring member engages the lower end face of the upper collar member, at which point, the body of the centraliser cannot move down any further in the axial direction, although it can still rotate around the tubular and the anchoring member. The optional welding or other fixing of the collar member in the end bore and the optional narrowed lip portion holds the collar portion within the body against the axial forces applied to the centraliser.

The collar member can be formed from various different materials within the scope of the invention, but in some embodiments can typically be formed of mild steel, and can optionally be brazed or soldered to the body. Typically the collar member is made of a different material to the body, and can be made from a material that can be moulded or cast, or otherwise worked into different shapes.

A significant benefit to the present design is that the free (but limited) relative movement of the collar members and the anchoring device before engagement of the two components takes place allows easier installation of the string and less deformation of the centraliser when running into the hole, as the axial force is only applied to the body of the centraliser from its leading end so that the centraliser is pulled into the hole from the leading end rather than being pushed into the hole from its trailing end. This means that the centraliser is stretched out axially during running in, causing the collar members to separate axially, and causing the resilient device extending radially outwards from the body and typically pressing tightly against the inner surface of the wall of the borehole to be stretched out beyond its normal resting position, thereby reducing its radial extension from the axis of the tubular and thereby reducing frictional resistance between the wellbore wall and the resilient device, which is a significant advantage to running in procedures, because less force is then needed to advance the string into the wellbore. This also reduces wear of the resilient devices and the wellbore wall. Thus the pulling action applied by the anchoring device engaging with the collar member at the leading end of the body of the centraliser tends to avoid premature radial expansion of the resilient devices, which can lead to jamming of the springs in a radially expanded configuration, excessive frictional resistance to running in, and additional wear and tear on the equipment.

Also, if the axial force pulling the centraliser into the hole stops during the running in procedure, then the stretched out centraliser is typically poised to quickly re-expand into an expanded configuration in which the resilient devices expand radially to press against the wellbore wall and the tubular is automatically centralised in the borehole simply as a result of the string stopping its axial advance into the borehole.

If the string being run into the hole needs to be pulled out of the hole, for example to try to negotiate past a sticking point, the sliding movement of the anchoring member within the body of the centraliser only applies axial force to the centraliser once it connects with the upper collar member, so centralisation of the tubular in the hole is maintained until the point at which the axial force is engaged on the centraliser, and at that point, the centraliser is once again being pulled from its leading end (due to the reversal of axial direction and the sliding of the anchoring member within the body) and therefore the same benefits of pulling rather than pushing the centraliser through the wellbore are automatically achieved.

The invention also provides method of centralising a tubular in a borehole for an oil, gas or water well, the method comprising the steps of providing a centraliser on the tubular, the centraliser having a body with a bore having an axis, the tubular being disposed in the bore of the body, the body having at least one resilient device configured to extend radially from the axis of the bore, and wherein the body has at least one collar member located adjacent to an end of the body, the method comprising the steps of fixing the centraliser to the string by means of a locking ring fixed to the tubular between the two ends of the body of the centraliser, and including the step of moving the centraliser in the hole by moving the tubular axially within the borehole thereby moving the locking ring with respect to the collar member on the body of the centraliser, wherein the centraliser is moved axially only when the locking ring is engaged with the collar member.

The invention also provides a method of making a centraliser for centralising a tubular in an oil, gas or water well, the centraliser having a body, and the body having a bore with an axis, the bore being configured to receive the tubular to be centralised, the body having at least one resilient device configured to extend radially from the axis of the bore, and wherein the body has at least one collar member extending radially inwards from the centraliser body adjacent to an end of the body, the method comprising forming the body and the resilient device from a single piece of resilient material, and retaining the collar within the bore of the body by a lip on the body that extends radially into the bore to prevent axial movement of the collar member out of the bore.

The various aspects of the present invention can be practiced alone or in combination with one or more of the other aspects, as will be appreciated by those skilled in the relevant arts. The various aspects of the invention can optionally be provided in combination with one or more of the optional features of the other aspects of the invention. Also, optional features described in relation to one embodiment can typically be combined alone or together with other features in different embodiments of the invention.

Various embodiments and aspects of the invention will now be described in detail with reference to the accompanying figures. Still other aspects, features, and advantages of the present invention are readily apparent from the entire description thereof, including the figures, which illustrates a number of exemplary embodiments and aspects and implementations. The invention is also capable of other and different embodiments and aspects, and its several details can be modified in various respects, all without departing from the spirit and scope of the present invention. Accordingly, the drawings and descriptions are to be regarded as illustrative in nature, and not as restrictive. Furthermore, the terminology and phraseology used herein is solely used for descriptive purposes and should not be construed as limiting in scope. Language such as "including", "comprising", "having", "containing" or "involving", and variations thereof, is intended to be broad and encompass the subject matter listed thereafter, equivalents, and additional subject matter not recited, and is not intended to exclude other additives, components, integers or steps. Likewise, the term "comprising" is considered synonymous with the terms "including" or "containing" for applicable legal purposes.

Any discussion of documents, acts, materials, devices, articles and the like is included in the specification solely for the purpose of providing a context for the present invention. It is not suggested or represented that any or all of these matters formed part of the prior art base or were common general knowledge in the field relevant to the present invention.

In this disclosure, whenever a composition, an element or a group of elements is preceded with the transitional phrase "comprising", it is understood that we also contemplate the same composition, element or group of elements with transitional phrases "consisting essentially of", "consisting", "selected from the group of consisting of", "including", or "is" preceding the recitation of the composition, element or group of elements and vice versa.

All numerical values in this disclosure are understood as being modified by "about". All singular forms of elements, or any other components described herein are understood to include plural forms thereof and vice versa.

In this disclosure, the terms "up" and "down" and similar terms will be used in reference to wells and will be understood to mean that "up" signifies a direction towards the wellhead of the well or the surface, and "down" signifies a direction towards the bottom of the wellbore. It will be understood by the skilled person that wells are often deviated and a section of the wellbore that is close to the top of the well can often be deeper underground than another section of the wellbore than is closer to the bottom of the wellbore.

In the accompanying drawings,

FIG. 1 is a side view of a centraliser according to the invention;

FIG. 2 is a sectional view through line A-A of FIG. 1;

FIG. 3 is a close up view of the side sectional view of FIG. 2 showing the detail in highlighted area B;

FIG. 4 is side view of a first embodiment of a collar member used in the centraliser of FIG. 1; and FIG. 5 is a second variation of a collar member which could be used in the centraliser of FIG. 1.

Referring now to the drawings, FIG. 1 shows a side view of a first embodiment of a centraliser according to the invention. The centraliser 10 has a generally tubular body 15 with upper and lower ends 16, 17. The body has a central axis A-A extending between the two ends 16, 17. The ends 16, 17 have generally the same cylindrical shape, with a circular cross-section. Between the upper and lower ends 16, 17, a central part of the body 15 comprises at least one resilient device, in this case in the form of bow springs 20, which extend between the generally cylindrical upper and lower ends 16, 17. The bow springs 20 typically adopt a radially extended or "bowed out" resting position, and are resiliently biased or energised when moved out of the radially extended position, either due to compression as a result of radial inward movement or due to expansion as a result of radial outward movement from the axis of the body 15.

Typically, the body 15 is formed from a single sheet of rolled spring steel, from which slots are cut between the strips of metal that will later form the bow springs 20 in the assembled centraliser 10. The slots formed between the bow springs 20 typically extend parallel to the axis of the body, and run substantially for the length of the body between the two cylindrical ends of the body 16, 17. The bow springs 20 are typically spaced circumferentially apart, at equal distances from one another. Typically, two, three, four, five, six or some other number of bow springs 20 are provided in the body 15, and typically the slots between the bow springs are relatively long and wide, allowing free movement of the bow springs radially with respect to the axis of the body 15.

Typically, the bow springs 20 are urged into the expanded configuration by applying an axially compressive force between the upper and lower ends 16, 17 of the body 15, and optionally the body 15 is then treated while maintaining the axially compressed configuration, e.g. by heat treating, so that when the heat or other treatment is finished, the bow springs 20 retain the radially expanded configuration as a resting configuration. This means that deviation of the bow springs 20 in a radial direction either towards or away from the central axis of the body 15 energises the bow springs and urges them to return to the resting (expanded) configuration shown in FIG. 1.

Typically, the body 15 is formed by rolling a flat sheet of sprung steel after the slots have been cut to form the bow springs 20 in the flat sheet. Typically, the sides of the flat sheet are welded or otherwise fixed together in order to form a generally tubular structure, which is then forced into the radially expanded configuration shown in FIG. 1, either by axial compression of the ends, and/or by radially moving the bow springs into the radially expanded configuration by means of an internal frame or bracing structure during the heat treatment process.

After the body 15 has been stamped or otherwise formed, fixed into the form of a tube and treated with e.g. heat to retain the radially expanded configuration of the bow springs 20, the cylindrical upper and lower ends 16, 17 of the body are typically fitted with collar members 25. The collar member 25 is formed to be a tight fit within the inner diameter of the cylindrical upper and lower end 16, 17. Typically, the collar member 25 can be offered up to the open bore of the formed body, i.e. inserted through the open bore in the upper and lower ends 16, 17. The collar member 25 can typically be fixed in place, for example, it can be welded (e.g. spot welded) in place in the cylindrical upper and lower ends 16, 17 so as to resist rotation and axial movement of the collar member 25 relative to the body 15. Other methods of fixing the collars in place can be used. After insertion of the collar 25 member into the upper and lower ends 16, 17 of the body 15, the lip 16l, 17l which extends axially beyond the end of the collar member 25 is typically bent or swaged or otherwise forced radially inwards in relation to the bore of the body in order to retain the collar member 25 within the bore between the cylindrical ends 16, 17 of the body 15. Optionally the lip can be formed before insertion of the collar members 25 into the bore. As part of this lip formation process, the lip 16l, 17l can optionally be perforated or split or can have material removed from it in order to form cutaway sections in order to facilitate bending, folding or other forced manipulation of the lip, in order to form the radial restriction provided by the narrowing of the lip at the outside ends of the collar members 25. The narrowing of the lip helps to retain the collar member 25 within the body 15 of the centraliser 10, and helps to resist axial forces that may tend to dislodge the collar member from the body 15.

In one possible variation, instead of the collar member being a solid annular ring as is the collar member 25, it can be provided in the form of a split ring 25a as shown in FIG. 5. This has other advantages which will be described in due course.

The collar member 25 (or other variations of collar members) typically has flat end faces. The flat end faces typically extend radially inwards of the body to interact with an anchoring device in the form of a locking ring 30 which is typically formed in the same dimensions as the collar members 25, and which typically has apertures or other formations in order to enable it to be fixed to the tubular to which the centraliser is connected. In practice, the centraliser is provided with the body 15 having the collar members 25 inserted and welded in place as shown in FIG. 1, and the central locking ring 30 provided loose. Typically, the central locking ring 30 and/or the collar members can be passed through the slots between the formed bow springs 20, and then turned so that it is co-axial with the bore of the body 15, and so that the locking ring 30 is co-axial with the collar members 25, at which point, the whole assembly of the centraliser 10 and the locking ring 30 is offered to the tubular and slid over the outer diameter thereof. When the centraliser 10 is in the desired location, the locking ring 30 is fixed to the outer surface of the tubular by fixing the locking ring by known means, by using grub screws, locking mechanisms, tongue and groove arrangements or slips, etc, typically manipulating them via torque tools that are passed through the slots between the bow springs 20. Once the locking ring 30 is fixed to the outer surface of the tubular, the axial movement of the centraliser 10 relative to the locking ring 30, and therefore relative to the tubular is limited such that the centraliser 10 can move down the tubular until the upper surface of the locking ring 30 abuts against the lower surface of the collar member 25 in the upper end of the centraliser body 16. Also, the centraliser can move up the string relative to the fixed locking ring 30 until the lower end face of the locking ring 30 abuts against the collar member 25 that is located in the lower end of the centraliser body 17. At all times, the centraliser 10 is typically free to rotate around the tubular without interference from the locking ring 30.

When the centraliser 10 has been applied to the string and the locking ring 30 has been fixed to the outer surface of the tubular, the tubular is run into the hole. As the tubular is forced axially into the hole, the centraliser 10 allows the string to slide through the body 15 until the lower end face of the locking ring 30 is pressing against the upper end face of the collar member 25 at the lower end 17 of the centraliser 10. Therefore, the force moving the centraliser into the hole is being applied near to the bottom of the centraliser body 15. As the centraliser 10 is pulled into the confines of the wellbore, the bow springs 20 are compressed radially inward by the confines of the wellbore, creating frictional resistance (i.e. drag) between the outer surface of the bow springs 20 and the inner surface of the wellbore. However, as the force moving the centraliser axially through the wellbore is being applied from the near leading end of the centraliser (i.e. the lower end 17) as a result of the sliding movement of the locking ring 30 within the body 15 of the centraliser 10, the centraliser 10 is effectively being pulled from its leading end through the narrow constriction of the wellbore, thereby stretching the centraliser body 15, so that the upper and lower ends 16, 17 grow further apart, and the bow springs 20 naturally retract radially inwards, thereby reducing the force that is applied by the centraliser 10 to the inner surface of the wellbore. This greatly facilitates the running in procedure, because each centraliser is effectively being pulled nose first into the wellbore, and is being stretched out and radially compressed so as to reduce the drag. As the string effectively has to be pushed into the wellbore from above, and cannot be pulled in from below, the arrangement of the centraliser according to the invention permits an easier installation, and reduces drag, wear and tear on the components and time for running in.

In the event that the running in procedure is halted, for example because of a restriction encountered in the wellbore, the centraliser 10 is no longer being pulled by the engagement of the locking ring 30 on the lower collar member 25, and the centraliser 10 can then expand under the natural resilience of the bow springs 20 in order to equalise the stand-off between the tubular and the wellbore. Also, the string can be rotated relative to the centraliser 10 which can typically remain immobile within the wellbore, allowing the rotation of the string of tubulars within the bore of the centralisers. If the string has to be retracted from the wellbore in order to try a different method of running in, or to clear an apparent obstruction, then the centraliser remains immobile within the wellbore as the string of tubulars is moved up, causing the locking ring 30 to move from the lower end 17 towards the upper end 16. When it reaches the upper end 16, it abuts against the collar member 25 located in the upper end 16, and again applies axial force to move the centraliser. Once again, the centraliser 10 is pulled through the wellbore from its leading end rather than being pushed from its trailing end, which again stretches out the centraliser body 15, thereby reducing the radial extension of the bow strings 20, and reducing drag and wear and tear etc. as described above.

In certain embodiments of the invention, the centraliser is intended for use with length of tubular that have box or pin sections at their ends, and may well have other radial discontinuities over which the centraliser must pass before being secured in place. In this regard, the split ring variant 25a is especially useful, as it can be radially expanded by moving the split ends apart as it is moved over the radial discontinuity on the tubular (i.e. a box on the end of the tubular). Optionally, this can be done before the various components of the centraliser are assembled, for example before the collar 25a is welded into the bore at the ends 16, 17 of the body 15.

In some embodiments of the invention, the lip 16l, 17l shown in the drawings can be omitted, and the collars 25, 25a can be held in the bore at the ends 16, 17 by other means, for example solely by welding, or by fixtures such as grub screws, etc. In certain embodiments in which the collar member comprises at least one tab formed from the sheet material used to form the body, the tab can optionally be aligned with the slots between the bow springs and can optionally formed by removing sheet material from the lateral sides of the tab leaving the tab connected to the sheet by only one side adjacent to the end of the body, allowing the tab to be bent radially inwards of the sheet to form a narrowed section at the end of the body to restrict the movement of the centraliser body in relation to the anchoring member. The tab can be a single tab, or alternatively the collar can be formed of a number of tabs formed bent radially inwards from the body in this or an analogous manner. In some embodiments the or each tab could be formed from a different material from the body and attached to the body by welding or other methods disclosed above. The tabs in various embodiments can be aligned with the slots between the bow springs, but this is not essential and embodiments of the invention are contemplated in which the tabs are circumferentially aligned with the bow springs. The tabs can typically be axially aligned in the same plane along the axis of the body, so that the anchoring device contacts all the tabs in the array at the same time.

The invention claimed is:

1. A centralizer for an oil, gas or water well, the centralizer comprising:
   a body having a tubular configuration, the body having a cylindrical bore with an axis, the bore being configured to receive a tubular to be centralized;
   at least one resilient device biased configured to extend radially outward from the body;
   wherein the at least one resilient device is integral with the body;
   wherein the body has a first collar member extending radially inwards from the inner surface of the body adjacent to an end of the body, the first collar member being secured to the end of the body so as to prevent relative axial movement between the first collar member and the body, the body having a first radially inwardly extending lip formed on the body at a first end portion of the body axially spaced from the first collar member, and wherein the first lip is formed with a smaller inner diameter than the outer diameter of the collar member, to retain the collar member axially within the cylindrical bore of the centralizer body.

2. The centralizer as claimed in claim 1, wherein the body is treated to enhance the resilient properties of the body.

3. The centralizer as claimed in claim 1, wherein the first collar member is annular and extends at least partly around an inner circumference of the body of the centralizer.

4. The centralizer as claimed in claim 1 wherein the first collar member is discontinuous and extends only partly around an inner circumference of the body of the centralizer.

5. The centralizer as claimed in claim 1, comprising a second collar member retained by a second lip at a second end of the cylindrical bore of the body.

6. The centralizer as claimed in claim 1 wherein the first collar member comprises a split ring, having a split and first and second ends, wherein the split ring is capable of adopting different diameters as a result of opening or closing forces being applied to one of the first and second ends of the split ring.

7. The centralizer as claimed in claim 1, wherein the first collar member is fixed co-axially in the cylindrical bore so as to be resistant to axial movement of the collar member within the cylindrical bore relative to the body of the centralizer.

8. The centralizer as claimed in claim 1, wherein the first radially inwardly extending lip incorporates cutaway sections from which material has been removed in order to facilitate radial narrowing of the cylindrical bore at the first lip.

9. The centralizer as claimed in claim 1, wherein the body is adapted to receive within the cylindrical bore at least one anchoring device for connection to the tubular, wherein the anchoring device is configured to engage the first collar member within the cylindrical bore of the body so that relative movement of the centralizer and the tubular is restricted once the anchoring device is fixed to the tubular and the anchoring device engages the first collar member.

10. The centralizer as claimed in claim 9, wherein the body has an aperture adapted to allow passage of the anchoring device through the aperture for connecting the anchoring device to the tubular within the cylindrical bore of the body.

11. The centralizer as claimed in claim 9, wherein the anchoring device comprises an annular anchoring ring extending at least part of the way around an outer surface of the tubular, and wherein the annular anchoring ring is fixed to the tubular by at least one locking device after the annular anchoring ring has been applied to the tubular.

12. The centralizer as claimed in claim 9, wherein the anchoring device has at least one end face configured to radially overlap with an end face of the first collar member so that the end face of the anchoring device is adapted to engage the first collar member on the body and thereby restrict axial movement of the body relative to the fixed anchoring device within a limited range.

13. The centralizer as claimed in claim 12, wherein the end faces of the first collar member and the anchoring device are parallel.

14. The centralizer as claimed in claim 13, wherein the end faces of the first collar and the anchoring device are perpendicular to the axis of the bore of the body.

15. The centralizer as claimed in claim 9, wherein the anchoring device permits rotational movement of the body relative to the tubular while relative axial movement of the body and the tubular is restricted by engagement of the first collar member with the anchoring device.

16. The centralizer as claimed in claim 1, wherein the body is rolled from a sheet of resilient material into a tubular configuration and wherein the body is fixed in the tubular configuration.

17. The centralizer as claimed in claim 1, wherein the first collar member is formed as a separate member from the body and is secured to the end of the body after or during assembly of the body.

18. The centralizer as claimed in claim 1, wherein the body has at least one axially extending slot formed in a wall of the body between two ends of the body and wherein the slot is located circumferentially between the at least one resilient devices, and wherein the first collar member has a smaller outer diameter than an axial length of the slot in the body between the resilient members, and wherein the collar member has an axial depth that is less than a circumferential width of the slot between two resilient members, so that the first collar member is adapted to pass through the slot.

19. The centralizer as claimed in claim 1, wherein the first collar member is fixed to the body by a fixing method selected from the group consisting of brazing, welding and soldering the first collar member to the body.

20. The centralizer as claimed in claim 1, wherein the first collar member is made of a different material to the body, and wherein the first collar member is made from a moldable or castable material.

21. A method of centralizing a tubular in a borehole for an oil, gas or water well, the method comprising:
providing a centralizer on the tubular, the centralizer having a body having a tubular configuration with a cylindrical bore having an axis, the tubular being disposed in the cylindrical bore of the body, the body having at least one resilient device configured to extend radially outward from the axis of the body, wherein the body and the at least one resilient device are formed from a single sheet of resilient material, and wherein the body has a first collar member extending radially inwards from the inner surface of the body located adjacent to an end of the body;
securing the first collar member to the end of the body within the cylindrical bore of the centralizer body so as to prevent relative axial movement between the first collar member and the centralizer body, and forming a first radially inwardly extending lip on the body at a first end portion axially spaced from the first collar member by forcing the material of the body radially inwards into the bore at the first end portion of the body, wherein the first radially inwardly extending lip has a smaller inner diameter than the outer diameter of the first collar member;
fixing the centralizer to the string by means of a locking ring fixed to the tubular between the two ends of the body of the centralizer;
moving the centralizer in the hole by moving the tubular axially within the borehole thereby moving the locking ring with respect to the first collar member on the body of the centralizer; and
wherein the centralizer is moved axially only when the locking ring is engaged with the collar member.

22. The method as claimed in claim 21, including forming a lip at each end of the bore of the body.

23. The method as claimed in claim 21 wherein the first collar member comprises a split ring, having a split and first and second ends, wherein the split ring is capable of adopting different diameters as a result of opening or closing forces being applied to split one of the first and second ends of the split ring, and wherein the tubular has a radial discontinuity on outer diameter of the tubular, wherein the method includes moving the split ring over the radial discontinuity and increasing the diameter of the split ring by moving the first and second split ends circumferentially apart from one another around the radial discontinuity as the split ring moves over the radial discontinuity.

24. The method as claimed in claim 21, wherein the locking ring has at least one end face configured to radially overlap with an end face of the first collar member so that the end face of the locking ring is adapted to engage the first collar member on the body and thereby restrict axial movement of the body relative to the locking ring within a limited range, and wherein the method includes abutting the end faces of the first collar member and the locking ring.

25. A centralizer for an oil, gas or water well, the centralizer comprising:

a body, the body having a bore with an axis and first and second ends, the bore being configured to receive a tubular to be centralized;

the body having at least one resilient device configured to extend radially outward from the axis of the bore body;

wherein the body and the at least one resilient device are formed from a single sheet of resilient material;

wherein the body has first and second collar members fixed within the bore at respective first and second ends of the bore so as to prevent relative axial movement between the first collar member and the body, and extending radially inwards from the inner surface of the body, each of the first and second ends of the body having a lip formed on the body and extending radially inwardly into the bore of the body at respective end portion on the body axially spaced from the first and second collar members;

wherein each lip is formed by forcing the material of the body radially inwards into the bore at the end portions of the body;

wherein each lip is formed with a smaller inner diameter than the outer diameter of each of the first and second collar members, to retain each of the first and second collar members axially within the bore of the centralizer body;

wherein each lip incorporates at least one cutaway section from which material has been removed in order to facilitate radial narrowing of the bore at each lip;

wherein the body is adapted to receive within the bore at least one anchoring device for connection to the tubular;

wherein the at least one anchoring device is configured to engage at least one of the collar members within the bore of the body so that relative movement of the centralizer and the tubular is restricted once the anchoring device is fixed to the tubular and the anchoring device engages the at least one collar member, wherein the anchoring device has at least one end face configured to radially overlap with an end face of the at least one collar member so that the end face of the anchoring device is adapted to engage the collar member on the body and thereby restrict axial movement of the body relative to the fixed anchoring device within a limited range; and wherein the anchoring device permits rotational movement of the body relative to the tubular while relative axial movement of the body and the tubular is restricted by engagement of the collar member with the anchoring device.

26. The centralizer as claimed in claim 25, wherein the collar member is formed as a separate member from the body and is secured to the end of the body after or during assembly of the body.

27. The centralizer as claimed in claim 25, wherein:

the body has at least one axially extending slot formed in a wall of the body between two ends of the body and wherein the slot is located circumferentially between the at least one resilient devices;

the collar members have a smaller outer diameter than axial lengths of slots in the body between the resilient members; and the collar member has an axial depth that is less than a circumferential width of a slot between two resilient members of the at least one resilient member, so that the collar member is adapted to pass through the slot.

28. The centralizer as claimed in claim 25, wherein the end faces of the collar member and the anchoring device are flat and mutually parallel.

29. The centralizer as claimed in claim 25, wherein the end faces of the collar and the anchoring device are perpendicular to the axis of the bore of the body.

30. The centralizer as claimed in claim 25, wherein:

the collar member comprises a split ring, having a split and first and second ends;

the split ring is capable of adopting different diameters as a result of opening or closing forces being applied to split one of the first and second ends of the split ring;

the tubular has a radial discontinuity on an outer diameter of the tubular, wherein the method includes moving the split ring over the radial discontinuity and increasing the diameter of the split ring by moving the first and second split ends circumferentially apart from one another around the radial discontinuity as the split ring moves over the radial discontinuity.

* * * * *